United States Patent [19]

Thornton et al.

[11] Patent Number: 4,693,830

[45] Date of Patent: Sep. 15, 1987

[54] FLOCCULANTS FOR BRINE-CONTAINING SYSTEMS

[75] Inventors: David C. Thornton, Midland; Mark J. McKinley, Kawkawlin, both of Mich.

[73] Assignee: The Dow Chemical Company, Midland, Mich.

[21] Appl. No.: 779,345

[22] Filed: Sep. 23, 1985

Related U.S. Application Data

[63] Continuation-in-part of Ser. No. 688,775, Jan. 4, 1985, abandoned, which is a continuation-in-part of Ser. No. 479,297, Mar. 28, 1983, abandoned.

[51] Int. Cl.$^4$ .............................................. C02F 1/56
[52] U.S. Cl. ......................................... 210/734; 209/5; 210/728
[58] Field of Search ................... 209/5; 210/725, 727, 210/728, 732, 733, 734

[56] References Cited

U.S. PATENT DOCUMENTS

| | | | |
|---|---|---|---|
| 3,418,237 | 12/1968 | Booth et al. | 210/734 |
| 3,438,745 | 4/1969 | Smith | 209/5 |
| 3,545,941 | 12/1970 | Wilson | 209/5 |
| 3,617,572 | 11/1971 | Monagle | 210/734 |
| 3,647,396 | 3/1972 | De Wittie et al. | 209/5 |
| 3,692,673 | 9/1972 | Hoke | 210/734 |
| 3,805,951 | 4/1974 | Brogoitti et al. | 209/5 |
| 4,342,653 | 8/1982 | Halverson | 210/734 |
| 4,451,377 | 5/1984 | Luxemburg | 210/734 |
| 4,569,768 | 2/1986 | McKinley | 210/734 |

FOREIGN PATENT DOCUMENTS 795533 10/1979 South Africa.

Primary Examiner—Peter Hruskoci

[57] ABSTRACT

Aqueous dispersions of solids are readily flocculated in high brine-containing aqueous media using polymeric anionic flocculants containing from 5 to about 20 weight percent of repeating units containing a carboxyl group, e.g., sodium acrylate.

8 Claims, No Drawings

FLOCCULANTS FOR BRINE-CONTAINING SYSTEMS

CROSS-REFERENCE TO RELATED APPLICATION

This is a continuation-in-part of U.S. patent application Ser. No. 688,775, filed Jan. 4, 1985 now abandoned which was a continuation-in-part of U.S. patent application Ser. No. 479,297, filed Mar. 28, 1983, now abandoned.

BACKGROUND OF THE INVENTION

This invention relates to copolymeric materials which are useful as flocculants in brine-containing systems.

In the processing of mineral ores, coal and other industrial slurries, it is often necessary to flocculate suspended solids from an aqueous media containing relatively large amounts of brine before further processing can occur or the liquid media can be discharged, recycled or used. For example, in the case of mineral ores and coal-containing materials, it is desirable to separate the mineral or coal values from the unwanted clays, sand and other finely divided solids.

Conventionally, the flocculation of finely divided solids is accomplished by contacting the suspension with a water-soluble polymer having an anionic character. Unfortunately, divalent cations present in brine-containing systems interact with the anionic moieties of the polymer causing the polymer to be salted out or encapsulate clay particles and contract, thereby resulting in small flocs.

It has recently become a common practice to employ essentially nonionic water-soluble polymers to flocculate finely divided solids via weak hydrogen bonds. Unfortunately, such weak bonds are easily broken, and flocculation is not highly effective.

Therefore, it is highly desirable to provide a polymer for efficiently flocculating unwanted suspended solids in industrial slurries containing brine.

SUMMARY OF THE INVENTION

Accordingly, the present invention is an improved method for flocculating suspended particulate solids from a brine-containing aqueous medium. The method comprises contacting the aqueous medium with a flocculating amount of a water-soluble polymer comprising, in polymerized form, from about 80 to 95 weight percent of at least one nonionic, water-soluble, ethylenically unsaturated monomer and from 5 to about 20 weight percent of a water-soluble, ethylenically unsaturated monomer containing carboxyl groups or a water-soluble ethylenically unsaturated monomer containing groups which have been converted, during or subsequent to polymerization, to carboxyl groups.

A polymer containing the specified amounts of carboxyl groups can be effectively employed as a flocculant to give an unexpected rate and degree of flocculation using relatively small amounts of the polymer. In addition, it is found that the present invention can be practiced successfully without any prior or subsequent treatment of the brine-containing aqueous medium with other polymeric flocculants.

The practice of the present invention allows one to successfully flocculate any of a wide variety of suspended solids from a brine-containing aqueous media. Of particular interest for treatment in accordance with this invention are the suspensions of minerals and ore pulp such as pulps made from weathered ores and mineral products, gold ores, copper ores, copper flotation concentrates, copper tailings and copper residues, bauxite ores, beryllium and palladium ores, zinc sulfide concentrates, cyanidation tailings containing pyrite, gold- and uranium-bearing materials, titanic sulfate digestion residues, as well as suspensions of ores and minerals such as zinc refinery sludges, flotation product, zirconium oxide and iron oxide slimes, and various coal slurries, particularly coal slurries containing bituminous and anthracite coal fines.

DETAILED DESCRIPTION OF THE INVENTION

The water-soluble polymers suitably employed in the practice of this invention are polymers comprising, in polymerized form, at least one nonionic, water-soluble, ethylenically unsaturated monomer and at least one water-soluble, ethylenically unsaturated monomer containing carboxyl groups or a water-soluble ethylenically unsaturated monomer-containing groups which are capable of being converted, during or subsequent to polymerization, to carboxyl groups. Hereinafter, said polymer is referred to as an "anionic polymer".

Ethylenically unsaturated, water-soluble monomters suitable for use in this invention are those which are water-soluble and which are capable of being polymerized to form a polymer which is at least inherently water-dispersible and preferably water-soluble. For the purposes of this invention, a water-soluble polymer is one which forms a thermodynamically stable mixture when combined with a brine-containing aqueous medium. These mixtures include (1) true solutions in which the individual polymer molecules are dispersed and (2) micellular or colloidal solutions wherein the polymer molecules are aggregated to some extent but wherein such aggregates are no larger than colloidal size. Preferably, the polymer is capable of forming at least a 1, preferably a 5, more preferably a 10 weight percent solution in an aqueous liquid.

The carboxyl groups can be incorporated within the anionic polymer by means of an ethylenically unsaturated carboxylic acid having from 3 to 8, preferably 3 or 4, carbon atoms such as acrylic acid, methacrylic acid, crotonic acid and the like. Alternatively, an ethylenically unsaturated monomer containing groups which can be converted, during or subsequent to polymerization, to carboxyl groups, can be employed. Representative of these monomers are the ethylenically unsaturated carboxamides such as acrylamide, methacrylamide, fumaramide and the like which can be hydrolyzed to form a carboxyl group. The term "carboxyl monomer" shall refer herein to both monomers containing the carboxyl groups as well as groups which can be converted to carboxyl groups. Preferably, acrylic acid or methacrylic acid (or, alternatively, acrylamide or methacrylamide) is employed as the carboxyl-containing monomer in preparing the anionic polymer. It is understood that the anionic polymer can be prepared by homopolymerizing a nonionic monomer such as acrylamide or other monomer containing hydrolyzable groups and thereafter hydrolyzing the desired amount of pendant amide groups to carboxyl groups.

Exemplary nonionic monomers suitably employed in the practice of this invention include ethylenically unsaturated amides such as acrylamide, methacrylamide and fumaramide; their water-soluble N-substituted nonionic derivatives such as the N-methylol derivatives of acrylamide and methacrylamide as well as the N-methyl and N,N-dimethyl derivatives of acrylamide and methacrylamide; hydroxyalkyl esters of unsaturated carboxylic acids such as hydroxyethyl acrylate and hydroxypropyl acrylate; and the like. Of the foregoing nonionic monomers, the ethylenically unsaturated amides are preferred, with acrylamide being most preferred.

The anionic polymers employed in the practice of the present invention contain, in polymerized form, from about 80 to 95 weight percent of the nonionic monomer and from 5 to about 20 weight percent of the carboxyl-containing monomer. Within this compositional limitation, the amount of each monomer most advantageously employed is dependent on a variety of factors including the specific monomers employed, the specific end-use application and the desired flocculant capability of the polymer. In general, the anionic polymers will preferably comprise, in polymerized form, from about 85 to 95, most preferably from about 89 to about 94, weight percent of the nonionic water-soluble monomer(s), and from 5 to about 15, most preferably from about 6 to about 11, weight percent of the carboxyl-containing monomer.

The molecular weight of the anionic polymer is sufficient to enable the polymer to function as a flocculant, but less than that which would render the copolymer insoluble in water. Preferred polymers have number average molecular weights (Mw) in the range from about 100,000 to about 10 million, most preferably from about 2 million to about 8 million.

The anionic polymer useful in the practice of the present invention can further comprise one or more anionic monomer(s) other than the carboxyl-containing monomer. Representative examples of such water-soluble, ethylenically unsaturated monomers containing anionic moieties include $\alpha,\beta$-ethylenically unsaturated N-sulfoalkylamides such as 2-acrylamido-2-methylpropane sulfonic acid, 2-acrylamide propane sulfonic acid, 2-acrylamide ethane sulfonic acid and the alkali metal salts thereof such as the sodium and potassium salts thereof as well as other such monomers listed in U.S. Pat. No. 3,692,673 which is hereby incorporated by reference; sulfoalkyl esters of unsaturated carboxylic acids such as 2-sulfoethyl methacrylate and other such sulfoalkyl esters as listed in U.S. Pat. No. 4,075,134 which is also incorporated by reference as well as the alkali metal salts thereof; sulfoarylalkenes such as vinylbenzyl sulfonic acid and the various salts of vinylbenzyl sulfonate, p-styrene sulfonic acid and the salts thereof; sulfoalkenes such as vinyl sulfonic acid and the salts theeof; and the like. Of the foregoing sulfonate monomers, the sulfoalkyl derivatives of acrylamide and methacrylamide are preferred with those of acrylamide being especially preferred, particularly 2-acrylamide-2-methylpropane sulfonic acid (AMPS), 2-acrylamido-2-propane sulfonic acid and the salts thereof. Preferably, the sulfo group is in the form of an alkali metal sulfonate salt such as sodium sulfonate.

If employed, the amount of these sulfonate monomers most advantageously used is dependent on the end-use application, specific monomers employed and their concentration and the desired flocculant capability. In general, these sulfonate monomers will be employed in amounts of less than about 10, preferably from about 1 to about 10, weight percent based on the total weight of the anionic polymer. The most preferred anionic terpolymers comprise, in polymerized form, from about 1 to about 5 weight percent N-sulfoalkyl ethylenically unsaturated amide or a salt thereof, from 5 to about 10 weight percent sodium acrylate, and from about 85 to about 94 weight percent acrylamide.

The anionic polymers are readily prepared by conventional procedures such as aqueous phase polymerization as described by Schildknecht (II) in *Polymer Process*, Interscience, 191–194 (1956) or disperse aqueous phase polymerization as described in U.S. Pat. No. 3,284,393. Normally such polymerization is carried out in the presence of a polymerization initiator capable of generating free radicals. Preferably, this free radical initiator is employed in amounts from about 0.0001 to about 0.1 weight percent of initiator based on the monomers. Exemplary polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropylbenzene hydroperoxide and t-butyl hydroperoxide. Of these initiators, the organic peroxygen compounds are preferred. Particularly preferred are combinations of these peroxygen compounds with reducing agents to provide conventional redox catalyst systems. Examples of such reducing agents are sodium bisulfite, sulfur dioxide, sodium borohydride and the like. In addition to the aforementioned ingredients, the polymerization recipe optionally includes chain-transfer agents such as isopropyl alcohol, chelating agents, buffers, salts and the like.

In the practice of the present invention, the brine-containing aqueous system is contacted with a functionally effective amount of the anionic polymer which amount is sufficient to remove the suspended particles from the aqueous phase.

As used herein, the term "brine" is an aqueous solution containing a relatively high concentration of monovalent, divalent or trivalent metallic cations such as those of iron, aluminum, calcium, magnesium, sodium or potassium. As used herein, brine solutions contain, for example, from about 200 to about 200,000 weight parts per million weight parts water of divalent cation, and/or about 500 to about 500,000 ppm monovalent cation.

Preferably, the amount of anionic polymer employed to flocculate the suspended solids is in the range from about 2.5 to about 5000, more preferably from about 12.5 to about 1000, most preferably from about 45 to about 500, weight parts of the anionic polymer per million weight parts of solids in the brine-containing suspension. In such cases, the clay particles are flocculated and the dissolved metal values are recovered via conventional techniques such as electrolysis, precipitation, or the like.

In preferred embodiments wherein the suspension is of mineral material which contains, in addition to the mineral value, a clay or similar silicate material, the anionic polymer is added in an amount sufficient to flocculate the clay particles and, in some cases, as in potash treatment, metal values.

The mode of adding the anionic polymer to the brine-containing suspension is not particularly critical as long as a uniform dispersion of the polymer in the suspension is achieved. Advantageously, however, the polymer is dissolved or dispersed, preferably dissolved, in an aqueous solution in concentrations from about 0.0001 to about 2 weight percent, most preferably from about 0.025 to about 0.2 weight percent, prior to the addition to the suspension. It is understood that the anionic polymer may be added as a water-in-oil emulsion to the brine-containing suspension. Examples of such emulsions are described in U.S. Pat. No. RE 28474. Such emulsions contain sufficient water-soluble surfactant to cause inversion of the emulsions when combined with the suspension. Alternatively, the emulsion may be inverted to form an aqueous solution and then added to the suspension.

In using the described anionic polymers in flocculating suspended particulate solids, it is often desirable to add a small amount of dispersant or emulsifier to the brine-containing aqueous media to promote dispersion of the polymer therein. A nonionic surfactant is especially preferred, and representative surfactants include (1) alkyl polyethyleneoxy compounds such as alkyl polyethyleneoxy alcohol represented by the formula:

$$R—(EO)_n—H$$

wherein R is $C_4$-$C_{20}$ alkyl, EO is ethyleneoxy and n is a number from 1 to 10 and (2) nonionic surfactants such as the reaction product of ethylene oxide or mixtures of ethylene oxide and higher alkylene oxide with active hydrogen compounds such as phenols, alcohols, carboxylic acids and amines, e.g., alkylphenoxyethyleneoxy alcohols and alkylphenoxy polyethyleneoxy alcohols.

The anionic polymers which are used in the practice of this aspect of the invention are particularly effective in brine solutions where the pH is in the range from about 4 to about 10, however, said copolymers can also be used in a range from about 0.5 to about 13.5. Typically, the process is performed wherein the aqueous medium is at a temperature below 200° F., preferably below 150° F., more preferably at room temperature or factory temperature (i.e., about 50° F. to about 100° F.).

The following examples are given for the purposes of illustrating the present invention and should not be construed as limiting its scope. Unless otherwise indicated, all parts and percentages are by weight.

EXAMPLE 1

The following general procedure is used to prepare the polymers used in the process of this invention and those used for comparison purposes.

Into a liter reaction kettle equipped with a stirrer, thermocouple, nitrogen inlet tube, gas vent and a heating mantle are charged the following with stirring:
(1) 16 g of a 50 percent solution of sodium 2-acrylamide-2-methylpropane sulfonate (NaAMPS) in water (pH=9-9.5);
(2) 164 g of a 50 percent solution of acrylamide (AAM) in water (pH=5.5);
(3) 420 g of water; and
(4) 5 g of sodium carbonate.
Nitrogen is bubbled through the stirred solution for 1 hour. To this stirred solution are then added the following solutions:
(1) aqueous solution of pentasodium salt of (carboxymethylimino)bis(ethylenenitrilo)tetraacetic acid (V-80) sufficient to provide 4000 ppm of V-80 in the stirred solution;
(2) aqueous solution of t-butyl hydroperoxide (TBHP) sufficient to provide 400 ppm of TBHP in the stirred solution; and
(3) aqueous solution of sodium borohydride ($NaBH_4$) sufficient to provide 3 ppm of $NaBH_4$ in the stirred solution.

The temperature of the stirred solution rises to 15° C.-25° C. and is maintained at such temperature for 1 hour. The water is removed from the resulting aqueous solution and dried to a white solid. The resulting copolymer is analyzed and found to contain, in polymerized form, 92 percent acrylamide, 6 percent hydrolyzed acrylamide (i.e., sodium acrylate) and 2 percent sodium salt of AMPS.

A polymer (Sample No. 2) containing no Na-AMPS and 10 percent sodium acrylate is prepared as described above. For purposes of comparison, a polymer (Sample No. C-1) containing no Na-AMPS and only 2 percent sodium acrylate and a polymer (Sample No. C-2) containing 30 percent sodium acrylate are prepared using similar techniques.

Each polymer sample is individually dissolved in water to provide a 0.1 percent solution of polymer. The solution is allowed to stand for a period of from 0.5 to 2 hours. This solution is then diluted to a concentration of b 0.025 percent immediately prior to use.

The brine-containing suspension contains a 30 percent suspension of potash ore which contains 2,500 ppm calcium and magnesium ions, and 130,000 ppm sodium and potassium ions. To the suspension is added 5 ml of diluted polymer solution in two equal amounts to yield a resulting suspension of 250 ml. This is placed into a 250-ml graduated cylinder which is stoppered and rotated end over end for 3 consecutive rotations after each addition. The flocculation of suspended solids is observed by measuring the rate of drop of interface between suspended solids and clear supernatant (settling rate).

Following the aforementioned general procedure, the settling rates of brine-containing clay suspensions are measured and the results are presented in Table I.

TABLE I

| Sample No. | % Acrylamide | % Hydrolyzed Acid | % Sulfonate[2] | % Anionic Monomer/Polymer | Settling Ratio[3] |
|---|---|---|---|---|---|
| 1 | 92 | 6 | 2 | 8 | 1.15 |
| 2 | 90 | 10 | 0 | 10 | 0.93 |
| C-1* | 98 | 2 | 0 | 2 | 0.43 |
| C-2* | 70 | 30 | 0 | 30 | 0.17 |

*Not an example of the invention
[1]Flocculant polymer comprises indicated amounts of nonionic acrylamide, sodium acrylate (hydrolyzed acid, anionic monomer) and AMPS-Na (anionic monomer).
[2]Sulfonate is AMPS-Na, i.e., sodium salt of AMPS.
[3]Settling rate is reported in inches/minute.

The data indicates that polymers containing from 5 to 20 weight percent of polymerized carboxyl-containing monomer (Sample Nos. 1 and 2) exhibit a higher settling rate than an essentially nonionic polymer (Sample No. C-1) or a polymer having a much higher anionic monomer content (Sample No. C-2).

What is claimed is:
1. An improved method for flocculating suspended particulate solids from a brine containing suspension of potash ore wherein said method comprises the steps of contacting the brine with a flocculating amount of a water-soluble anionic polymer comprising, in polymerized form, from about 85 to 94 weight percent of a non-ionic, water-soluble, ethylenically unsaturated acrylamide monomer and from 5 to about 10 weight per- cent of a water-soluble, ethylenically unsaturated monomer containing carboxyl groups or a water-soluble, ethylenically unsaturated monomer containing groups which have been converted, during or subsequent to polymerization to carboxyl groups selected from the group consisting of acrylic acid, methacrylic acid, and alkali metal salts thereof, and from about 1 to about 5 weight percent of a N-sulfoalkylamide selected from the group consisting of 2-acrylamido-2-methylpropane sulfonic acid, 2-acrylamide propane sulfonic acid, 2-acrylamide sulfonic acid, and alkali metal salts thereof; flocculating the suspended particulate solids; and settling the flocculated particulate solids from the brine.

2. The method of claim 1 wherein the N-sulfoalkylamide is 2-acrylamido-2-methylpropane sulfonic acid or an alkali metal salt thereof.

3. The method of claim 2 wherein the anionic polymer comprises, in polymerized form, from about 1 to about 5 weight percent of ethylenically unsaturated N-sulfoalkylamide or a salt thereof, from 5 to about 10 weight percent sodium acrylate, and from about 85 to about 94 weight percent acrylamide.

4. The method of claim 1 wherein the brine-containing suspension is at a pH from 0.5 to 13.5 and the amount of copolymer is in the range from about 2.5 to about 5000 weight parts per million weight parts of suspended particulate solids in the aqueous medium.

5. The method of claim 1 wherein the brine contains from about 500 to about 500,000 weight parts of monovalent cationic salts per million weight parts of water.

6. A method of claim 5 wherein the N-sulfoalkylamide is 2-acrylamido-2-methylpropane sulfonic acid or an alkali metal salt thereof.

7. An improved method for flocculating suspended particulate solids from a brine containing suspension of potash ore containing from about 500 to about 500,000 weight parts monovalent cationic salts per million weight parts water which can be performed without any prior or subsequent treatment of the brine with other polymeric flocculants wherein said method comprises the steps of contacting the brine at a temperature below 200° F. with a flocculating amount of a water-soluble anionic polymer comprising, in polymerized form, from about 85 to 94 weight percent of a non-ionic, water-soluble, ethylenically unsaturated acrylamide monomer from 5 to about 10 weight percent of a water-soluble, ethylenically unsaturated monomer containing carboxyl groups or a water-soluble, ethylenically unsaturated monomer containing groups which have been converted, during or subsequent to polymerization to carboxyl groups selected from the group consisting of acrylic acid, methacrylic acid, and alkali metal salts thereof, and from about 1 to about 5 weight percent of a N-sulfoalkylamide selected from the group consisting of 2-acrylamido-2-methylpropane sulfonic acid, 2-acrylamide propane sulfonic acid, 2-acrylamide sulfonic acid, and alkali metal salts thereof; flocculating the suspended particulate solids; and settling the flocculated particulate solids from the brine.

8. The method of claim 7 wherein the temperature is below about 150° F.

* * * * *